(No Model.)
H. BITNER.
TOASTER.
No. 492,517. Patented Feb. 28, 1893.
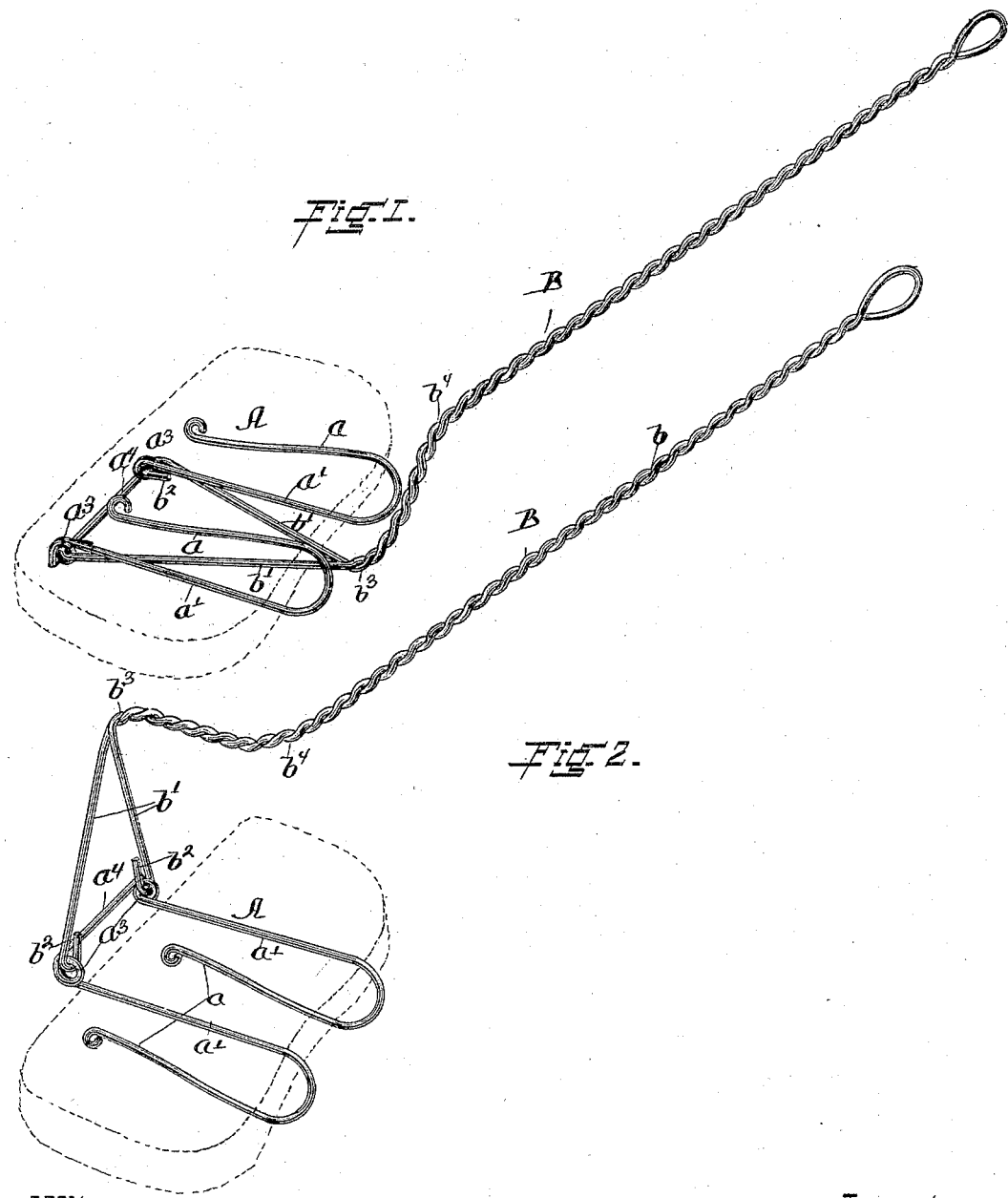
Witnesses:
Chas O Hervey.
Gerald Mahony.
Inventor:
Harry Bitner
By Wiles, Verne & Bitner
Attys

UNITED STATES PATENT OFFICE.

HARRY BITNER, OF CHICAGO, ILLINOIS.

TOASTER.

SPECIFICATION forming part of Letters Patent No. 492,517, dated February 28, 1893.

Application filed February 29, 1892. Serial No. 423,146. (No model.)

*To all whom it may concern:*

Be it known that I, HARRY BITNER, a citizen of the United States of America, residing at Chicago, in the county of Cook and State of Illinois, have invented certain new and useful Improvements in Toasters, of which the following is a specification.

My invention relates to certain improvements in bread toasters, designed to produce a toaster which shall be compact and neat in form and appearance, which shall hold the bread at an angle to the handle sufficient to enable it to be placed flat over the coals in a stove or grate, which shall be reversible without changing the plane in which the bread is held, and which shall have a bread holding device into which the bread may be inserted, and from which it may be removed without touching the toaster.

The preferred form of my invention is illustrated by means of two figures, both of which are perspectives, and the only difference between which is that in the second figure, the handle has been turned half way around upon its longitudinal axis.

The essential features of the invention will be pointed out in the claims appended hereto.

Describing the preferred form specifically, it is composed of a bread holder, A, secured to a handle, B, both preferably made of wire and in substantially the form shown, the holder being bent to form opposing spring jaws, $a$, $a'$, the latter terminating in eyes, $a^3$, united by a cross piece $a^4$. The handle is shown as made of two strands of wire twisted together throughout the greater portion of their length, $b$, but separated at one end, $b'$, and bent into hooks, $b^2, b^2$, upon which the eyes, $a^3$, are pivoted. The handle is bent at $b^3$, $b^4$, so as to bring the fork, $b'$, to a sufficient angle thereto to enable said fork to be held flat over the coals within the stove, no difference whether there be much or little fire in the latter. In use, the bread is slipped between the jaws $a, a'$, and is held by the spring thereof during the toasting operation. When the handle is held in the position shown in Fig. 1, the holder A, rests upon the fork, $b'$, and is supported thereby, but when the handle is reversed, as seen in Fig. 2, the holder drops away from said fork until the cross piece, $a^4$, strikes the hooks, $b^2$, when it is checked by said hooks and held in the position, shown in said Fig. 2. It should be noticed that the reversal of the handle turns the bread over, so that the opposite side is presented to the fire; but that during the turning, the bread holder drops automatically into substantially the same relative angle to the fire and to the handle as before. The second bend, $b^4$, brings the main portion of the handle into a line, substantially symmetrical to the two positions of the bread holder.

The advantages of the invention are obvious. The bread can be inserted without touching the bread holder which ordinarily becomes quite hot, and when the bread is once placed in the holder, it need not be removed until toasted upon both sides. The shifting or rocking of the bread holder which is necessary to enable it to be inverted, and yet maintain the same relative angles with respect to the fire and the handle requires no bothersome manipulation, it being accomplished merely by turning the handle in the fingers. The bread holder is so constructed that it is open upon three sides, so that the bread can extend almost indefinitely in these directions without obstruction, the fourth or closed side of the holder projecting toward the handle so that the bend in the latter need not be unnecessarily removed to accommodate the larger pieces of bread.

I claim as new and desire to secure by Letters Patent—

1. In a toaster, the combination with a loosely pivoted spring holder, of a handle having a portion adapted to be grasped by the hand, and a second portion adapted to furnish a support for the pivoted holder arranged at a sufficient angle to the first to enable said holder to be held flat over the fire when the hand is considerably above the same, and suitable stops to support the holder in two positions.

2. The combination with the bent handle, of a spring holder loosely pivoted to the end thereof and open toward said end and upon both sides, whereby the extension of the bread in these three directions is unobstructed, said holder extending backward toward the body of the handle from the pivotal point and being provided with suitable stops, whereby it may drop by its own gravity into a proper relative position to the handle when inverted.

3. The combination with a bent wire handle, of a wire holder pivoted at one end thereof and extending backward from said end to form two hooks open in a direction toward the end of the handle, and suitable stops to limit the swing of the holder; substantially as described.

4. The combination with a bent handle, B, of twisted wires separating at one end into a fork, $b'$, of a holder, A, comprising two spring hooks, $a, a'$, pivoted upon and open toward the ends of the fork, $b'$; substantially as described.

5. The combination with a bent handle, B, formed of twisted wires, separated at one end to form a fork, $b'$, provided with hooks, $b^2$, of a holder, A, made of wire bent to form a cross piece, $a^4$, eyes $a^3$, and hooks, $a'$, $a$; substantially as described.

HARRY BITNER.

Witnesses:
ROBT. H. WILES,
CHAS. O. SHERVEY.